United States Patent [19]

Dahm

[11] 4,133,436
[45] Jan. 9, 1979

[54] METHOD OF RETRIEVING ARTICLES FROM STORAGE AND AN APPARATUS FOR CARRYING OUT THE METHOD

[76] Inventor: Jan Dahm, Vagslia 24, Tertnes, Norway

[21] Appl. No.: 786,829

[22] Filed: Apr. 12, 1977

[30] Foreign Application Priority Data

Apr. 13, 1976 [NO] Norway ............................ 761276

[51] Int. Cl.² .............................................. B65G 1/04
[52] U.S. Cl. ............................ 214/16.4 A; 214/11 R
[58] Field of Search .................. 214/16.4 A, 16.4 C, 214/16 B, 730, 11 R

[56] References Cited

U.S. PATENT DOCUMENTS

| | | | |
|---|---|---|---|
| 3,407,926 | 10/1968 | Rosser | 214/16.4 A |
| 3,606,039 | 9/1971 | Weston et al. | 214/16.4 A |
| 3,674,159 | 7/1972 | Lemelson | 214/16.4 A |
| 3,786,944 | 1/1974 | Daigle et al. | 214/16.4 A |

Primary Examiner—Lawrence J. Oresky

[57] ABSTRACT

Article storage and handling systems for retrieving articles from a storage rack and transferring the articles to a collecting conveyor. An article retrieving device is adjusted into retrieving cooperation with a preselected one of a plurality of roller tracks of the rack, the height of the device being aligned with the particular track. A stopping mechanism for this roller track on actuation enables the article to be transferred from the rack to the retrieving device, this transfer being in a first direction of movement transversely of the length of the rack and with the assistance of the force of gravity of the article. From the retrieving device to the collecting conveyor, the article is moved continuously in a second direction along the length of the rack. The motion in both directions of movement is effected continuously.

4 Claims, 10 Drawing Figures

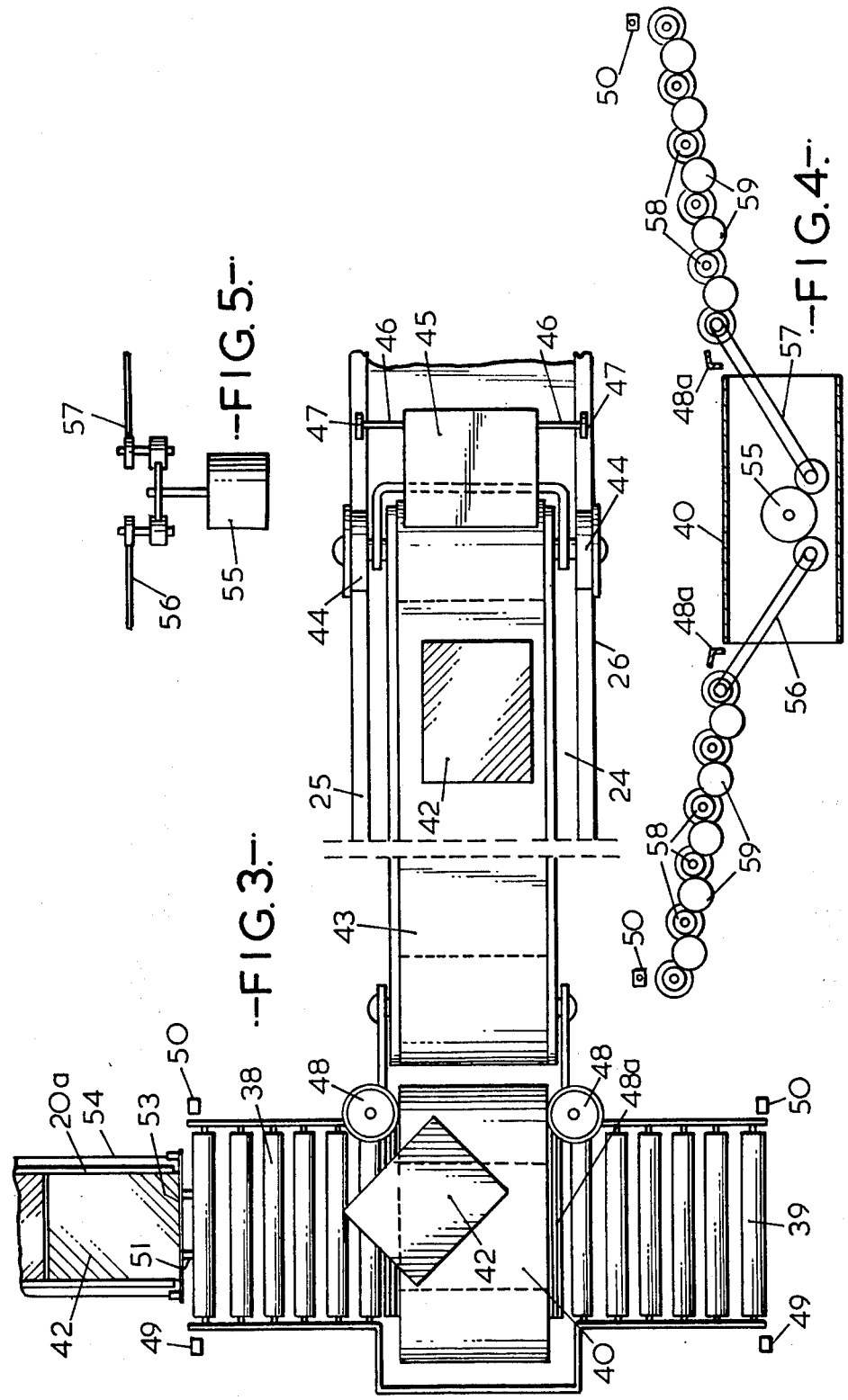

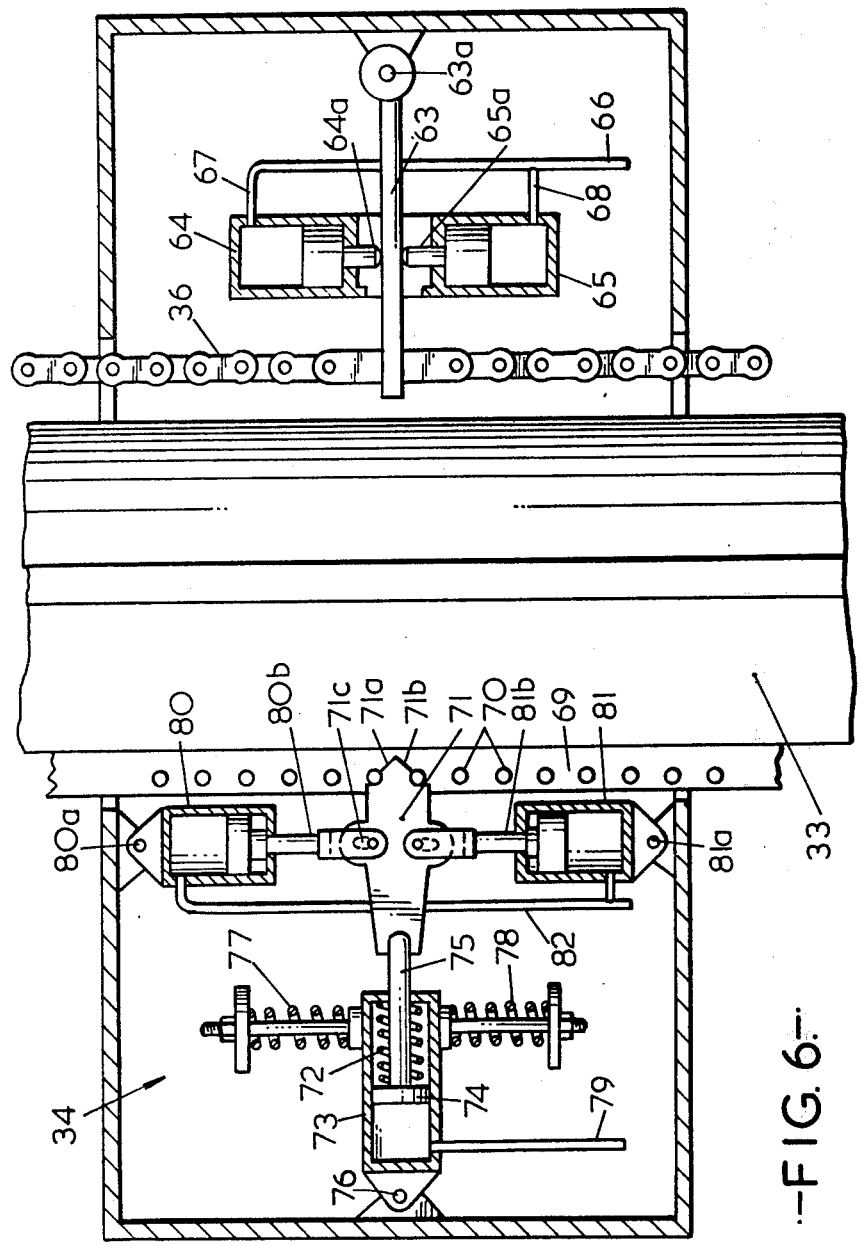

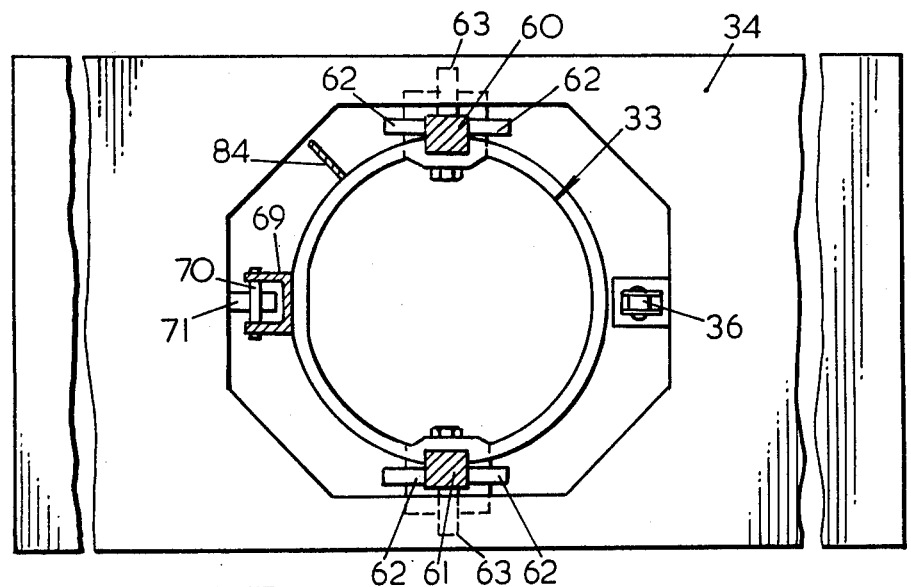
-FIG.7-
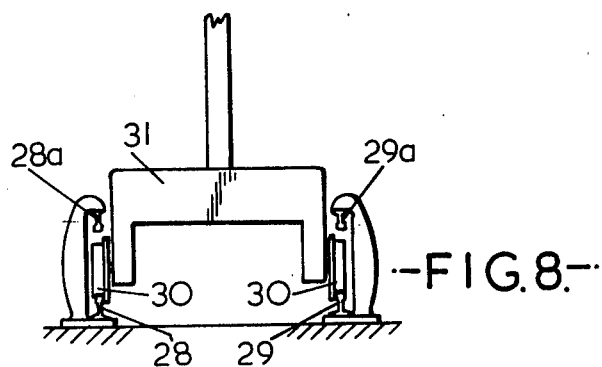
-FIG.8-
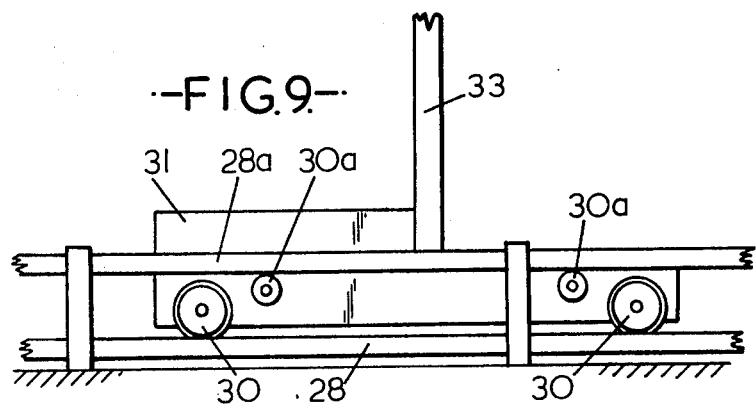
-FIG.9-

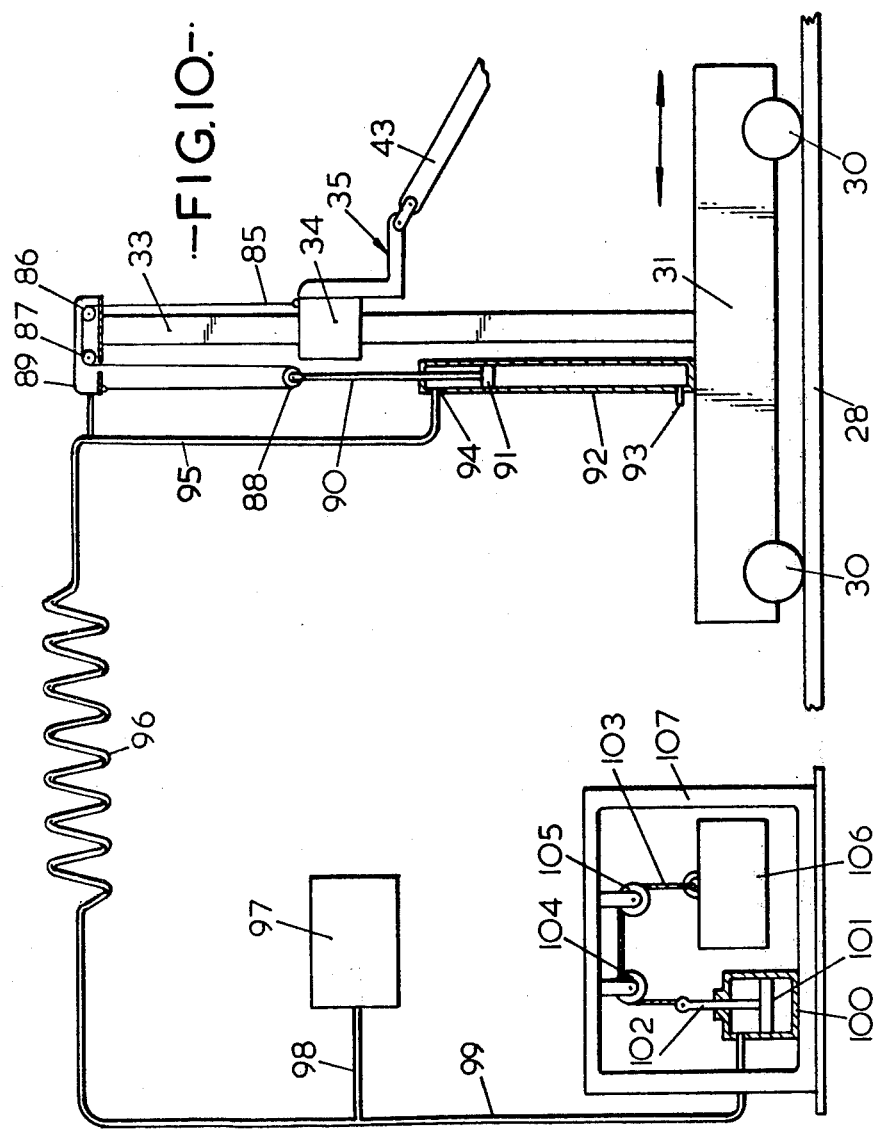

METHOD OF RETRIEVING ARTICLES FROM STORAGE AND AN APPARATUS FOR CARRYING OUT THE METHOD

BACKGROUND OF THE INVENTION

1. Field of Invention

This invention relates to article storage and handling systems for retrieving articles from a storage rack and transferring the articles to a collecting conveyor.

2. Description of the Prior Art

Racks or shelvings for articles are known having a horizontal row of mutually parallel supply tracks which discharge out onto a common conveyor and in which there is utilized a remotely controlled article stopping mechanism for each supply track. With such racks or shelvings, there is utilised a separate conveyor for each horizontal row of supply tracks, the conveyors being arranged at elevations above each other corresponding to the horizontal rows of supply tracks. Such known racks for articles of commerce or merchandise having conveyors arranged above each other, involve several disadvantages and limitations.

The conveyors arranged above each other will, necessarily, take up a substantial portion of the area endways outside the supply tracks so that it is difficult to achieve full employment of the volume of the rack in the height direction.

By employing a common conveyor for each horizontal row of supply tracks, where the supply tracks discharge directly out onto the conveyor, there is a demand for a special control of the supply tracks with a view to avoiding collisions between an article which strays on the conveyor and an article which is to be transferred from the supply track to the conveyor and blocking of the supply tracks or undesired accumulation of the articles on the conveyor. Special control must also be provided for, in order to ensure that the different articles are supplied in a definite sequence on the conveyor, independently of the mutual disposition of the articles in the rack. It is difficult to combine such requirements and needs with a rapid and accurate handling of the articles.

By employing a separately controlled article-stopping mechanism for each individual supply track, there results a complicated set-up of control mechanisms with a corresponding greater danger for malfunctioning or other failure in the control mechanisms.

U.S. Pat. No. 3,674,159 (Lemelson) discloses a warehousing system comprising a storage rack for storing loads thereon and a stacker crane moveable alongside the rack for depositing loads into and removing loads from selected storage locations in the storage rack. However, such a system is only concerned with transferring a load from the storage rack to a storage position on the stacker crane and not with conveying the load from that storage position to a delivery location. Apparently, the loads must be transported individually or in groups by way of the stacker crane, a rather awkward and time-consuming operation.

U.S. Pat. Nos. 3,528,566 (Weir) and 3,447,699 (Weir) certainly disclose conveying articles to a delivery location in a relatively simple manner but the withdrawal from the storage rack is performed manually. The operator must move the article outwardly from the rack and inwardly onto a transfer table from which it is shifted further inwards onto an inclined conveyor. In as much as the adjustment of the height of the article retrieving device is effected by manual control, this does not present a problem.

SUMMARY OF THE INVENTION

With the present invention the aim is to provide article storage and handling systems without the aforementioned disadvantages. The particlular objective is to reduce the danger of sources of error and other failures in the control system by allowing the combined supply tracks to be actuated by a single actuating means in combination with an article transfer assembly. Also the aim is to avoid the danger of collision between the various articles and to avoid the danger of blocking of certain supply tracks by providing for the separate transfer of the individual article from the common article transfer assembly to the common collecting conveyor. By employing a moveable article transfer assembly, the objective is also to be able to utilise the volume of the rack or shelving in a better manner than previously, independently of the assembly.

According to the present invention an article storage and handling system for retrieving an article from a storage rack and transferring said article to a collecting conveyor comprises (a) a storage rack having a series of drivable roller tracks arranged above each other as well as side-by-side;
(b) an article transfer assembly common to said series of roller tracks and comprising:
  (i) article retrieving means adapted to be drivably adjusted in a vertical direction into operative retrieving cooperation with a preselected one of said roller tracks, said retrieving means comprising guide means and a horizontal conveyor drivable transversely of the length of said guide means, said guide means providing a rectilinear path for said article between said roller track and said horizontal conveyor,
  (ii) an inclined conveyor one end of which cooperates with said horizontal conveyor and is adapted to be raised and lowered along with said article retrieving means,
  (iii) a carriage unit supporting said article retrieving means and inclined conveyor and including an upstanding column, and
  (iv) an adjusting means for adjusting the height of said article retrieving means into an accurately aligned position with respect to said preselected roller track and comprising rough and fine adjustment mechanisms,
(c) a horizontal collecting conveyor supporting the other, opposite end of said inclined conveyor and said carriage unit being mounted for horizontal displacement along said collecting conveyor; and
(d) a stopping mechanism for said preselected roller track enabling transfer of said article from said rack to said retrieving means; the horizontal conveyor, the inclined conveyor and the collecting conveyor being adapted to advance said article in continuous motion in one and the same direction and said column guidably permitting said article retrieving means to be moved by way of said rough adjustment mechanism somewhat beyond a desired position while the fine adjustment mechanism automatically and accurately adjusts said retrieving means into a preselected height position on said column, said rough adjustment mechanism comprising a pivotably mounted pressure medium cylinder operatively associated with an axially displaceable pawl moveable inwardly and self-centeringly into an intermediate space defined between guide pins arranged in a vertical row on a vertical guide rail of said column and said fine adjustment mechanism comprising at least one of a pair of compression springs and a pair of pressure medium-controlled control means arranged one on each side of said pawl and providing for the adjustment of said pawl into an accurately centered position.

BRIEF DESCRIPTION OF THE DRAWINGS

In order that the invention can be more clearly understood, convenient embodiments thereof will now be described, by way of example, with reference to the accompanying drawings in which:

FIG. 3 is a plan of the article storage and handling system on an enlarged scale, FIG. 4 is a schematic representation, partly in section, of further details of the article transfer assembly of the system, FIG. 5 shows details if FIG. 4 viewed from above, FIG. 6 is a cut-off vertical section showing details of the mechanism for accurate adjustment of the article retrieving means in the height direction, FIG. 7 shows the same as in FIG. 6 viewed from above, FIGS. 8 and 9 show in end view and side view respectively details of a carriage of the article transfer assembly, and FIG. 10 is a diagrammatic representation of a mechanism for counterbalancing the article transfer assembly.

DESCRIPTION OF CONVENIENT EMBODIMENTS

Figure 1:
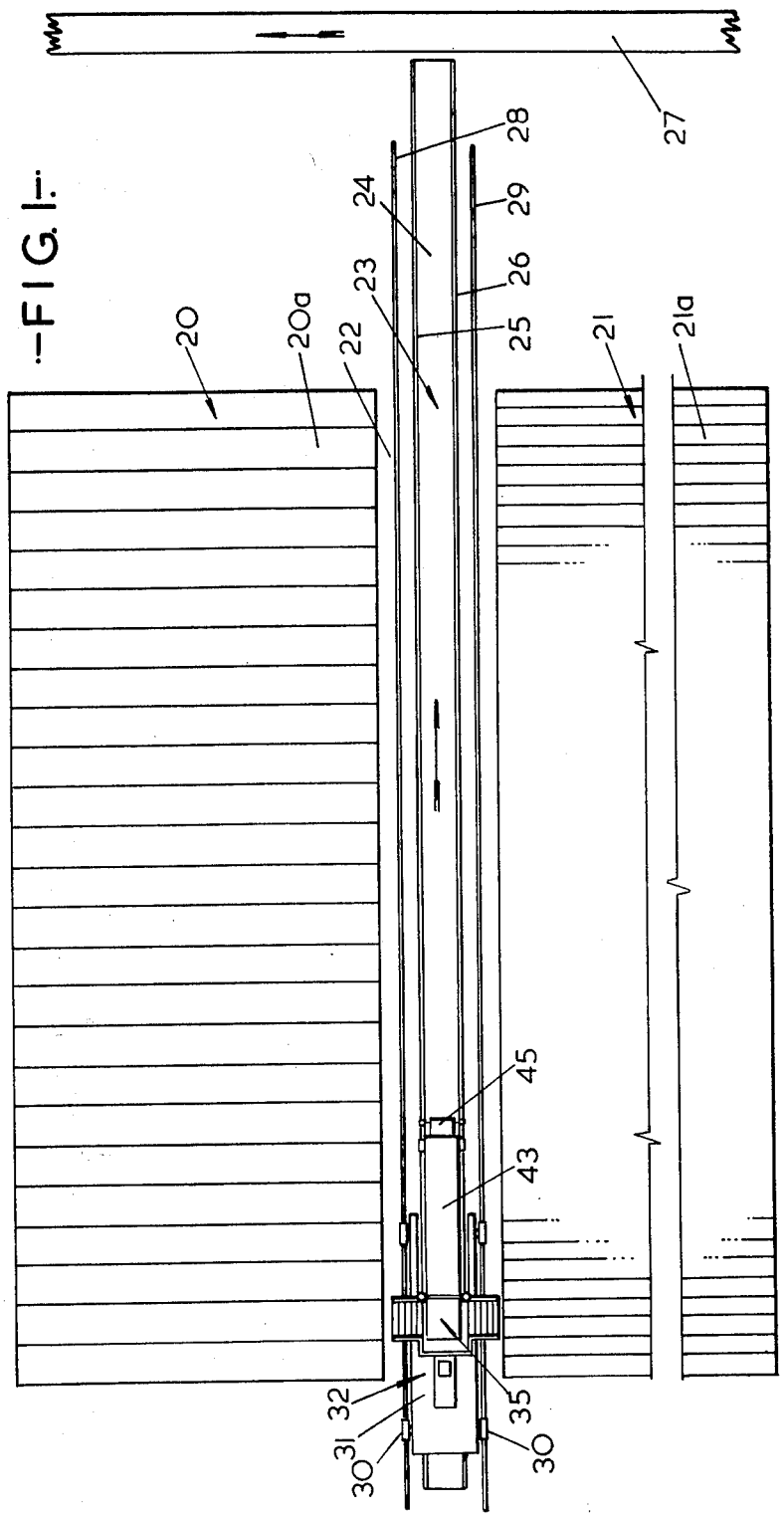
FIG. 1 is a plan of an article storage and handling system in which an article transfer assembly can serve two separate racks or shelvings.

Referring to FIG. 1, two mutually separate racks or shelvings 20, 21 are each provided with their respective rows of mutually parallel supply tracks 20a, 21a which extend slopingly downwards towards and discharge outwardly into an intermediate space 22 between the racks. The racks are adapted to be able to receive articles of commerce or merchandise of different dimensions and shapes, for example with dimensions varying from 2 × 10 × 10cm to 50 × 50 × 80cm and with weights of from 0.2 to 20 kg., or in larger structures with weights of from 2 to 100 kg.

In the intermediate space 22 between the racks 20 and 21, there is arranged a collecting conveyor 23 at the bottom of the racks. The conveyor 23 is formed by a conveyor belt 24 which is guided between two side supports 25, 26. At the one end of the conveyor 23, it pushes up to a transverse conveyor belt 27 which extends along a row of mutually separate racks, of which only two racks 20, 21 are shown in the drawing.

Coaxially of the conveyor 23, there extend a pair of rails 28, 29 which form guides for wheels 30 of a carriage 31 of an article transfer assembly 32. The carriage 31 is provided with a vertical column 33 which forms a guide for a head 34 of an article retrieving means 35, as is further evident from FIG. 2. The height of the head 34 is adjustable on the column 33 by means of a chain drive 36 which is driven by an electromotor 37 and can, as will be described further below, be adjusted in an accurate manner relative to the column 33.

Figure 2:
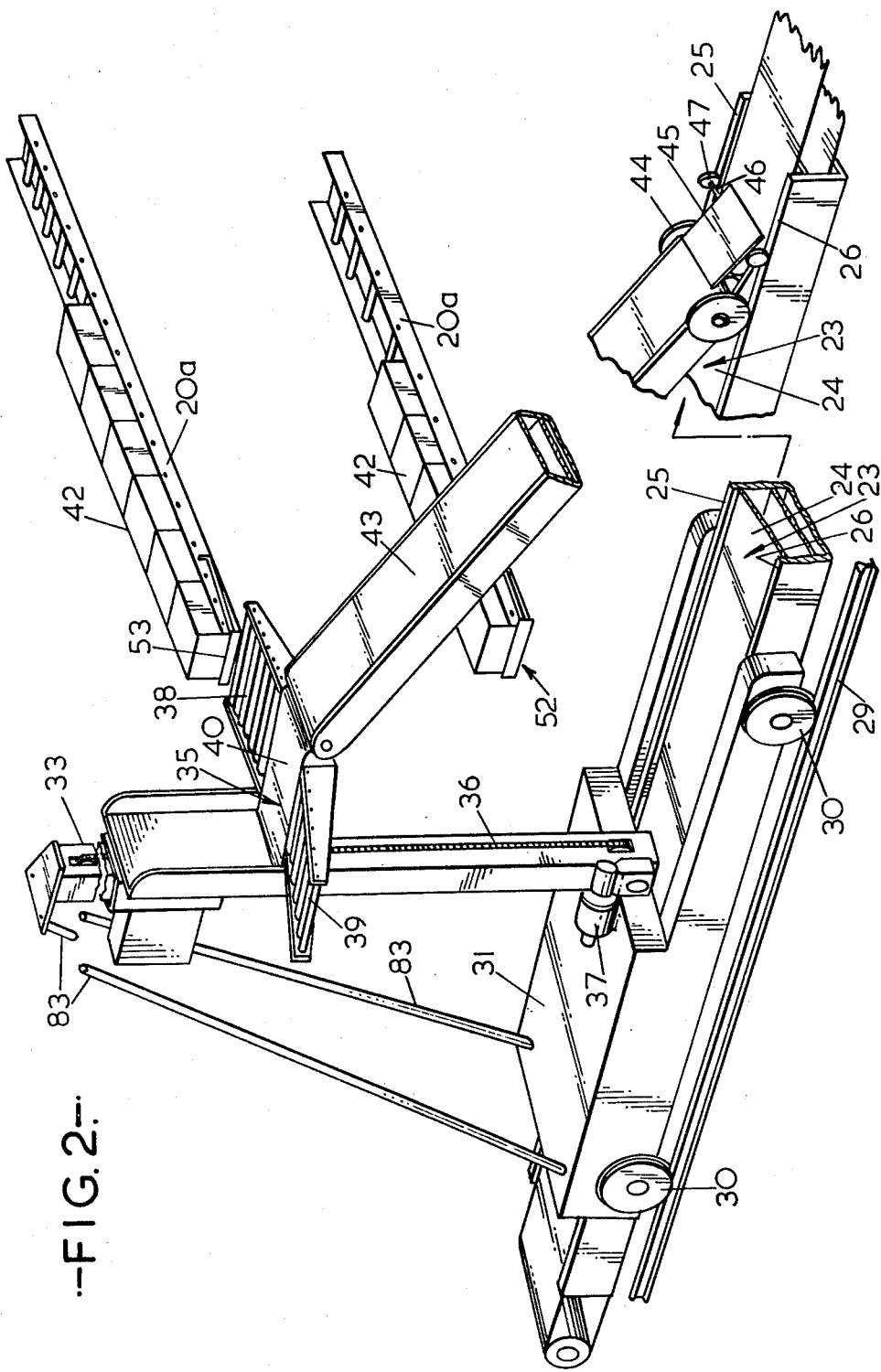
FIG. 2 is a cut-off perspective of the article storage and handling system showing only two of the many roller tracks of the rack or shelving.

The article retrieving means 35 comprises two oppositely directed roller tracks 38, 39 which extend slopingly downwards towards a common horizontal conveyor belt 40 having a smooth and uniform surface. The roller tracks 38 and 39 serve their respective racks 20 and 21. As is shown in FIG. 2, the one roller track is adjusted flush with one of many mutually separated roller tracks 20a of the rack 20. In FIG. 2, there are only shown two such rack roller tracks 20a which, for the sake of clarity, are arranged at a significant mutual distance in the vertical direction. However, it is apparent that the rack roller tracks can be arranged quite closely up to each other in a horizontal direction as well as in a vertical direction. The aim is also that the roller tracks 20a pass slopingly downwards towards roller track 38 which is also inclined downwards so that an article 42 which is received on rack roller track 20a can slide with uniform movement from the rack roller track directly over to the roller track of the article retrieving means and further from this directly outwards onto the horizontal conveyor belt 40. The conveyor belt 40 is driven in a direction transversely of the roller tracks 38, 39 and pushes up to a longitudinal conveyor belt 43 which, at the one end, is joined to the article retrieving means 35 and at the opposite end is provided with wheels 44 which roll on the top of the side supports 25, 26 of the collecting conveyor 23. Just by the wheels 44, there is arranged an inclined transfer plate 45 between the conveyor belt 43 and the conveyor belt 24. The transfer plate 45 is held in a stationary oblique position relative to the conveyor belt 24 resting against a shaft 46 having associated guide wheels 47 which roll on the top of the side suports 25, 26. On raising and lowering the article retrieving means 35, the conveyor belt 43 assumes different sloping positions, all according to need.

In FIG. 3 there is shown an article 42 as it is transferred from the roller track 38 to the transversely extending conveyor belt 40. By means of control wheels 48, there is ensured a desired rotation of the article 42 so that it is lead endways from the conveyor belt 40 over to the conveyor belt 43. In FIGS. 3 and 4, there are shown guide rails 48a which contribute to the desired orientation of the article on the conveyor belt 40.

At the outer end of the roller track 38 (39), there is shown a light 49 and a photocell 50 each on its respective side of the roller track. By means of the photocell, the transfer of an article 42 from a rack roller track to roller track 38 (39) of the article retrieving means can be controlled and guided. By means of a pair of actuating means 51 which, in a manner not shown further, can be brought into engagement with an article stopping mechanism 52 on the end of the respective rack roller track, the connection between the rack roller track 20a and the roller track 38 of the article retrieving means can be opened by remotely controlled actuation, and by means of the photocell the supply of one or more articles to the article retrieving means 35 can be regulated as required. The article stopping mechanism can consist of a stop plate 53 which is vertically displaceable just in front of the rack roller track by means of a blade spring system 54, the actuating means 51 being brought into engagement with corresponding openings in the plate 53 and pressing the latter downwards against the force of the spring mechanism 54. Immediately the engagement with the actuating means 51 is broken, the stop plate 53 is brought back to the blocking position in front of the roller track 20a.

In FIGS. 4 and 5, there is shown an electromotor 55 which, by means of belt transmissions 56, 57, drives a first roller of the roller tracks 38 and 39 while the remaining rollers of the roller tracks are driven by means of cooperating tooth wheels 58, 59. By means of the illustrated operation of the roller tracks, one can ensure that the article, immediately it is brought into engagement with the roller track 38, is drawn forcibly away from the rack roller track 20a and transferred in a safe manner via the roller track 38 (39) to the conveyor belt 40.

In FIGS. 6 and 7, there are shown details of the head 34 which is engaged to the support column 33. The column 33 is provided with two opposing rails 60 and 61 which provided engagement with the head 34 by means of ball bearings 62 and 63 so that the head can be guided in an accurately set path relative to the column 33. The chain 36 is connected to the head 34 by means of a pivot arm 63, one end of which is pivotably mounted at 63a of the head 34 and the opposite end of which is fixed to the chain 36. The head 34 is held in an exact position relative to the chain 36 by means of two compressed air cylinders 64 and 65 each having its respective actuating means 64a and 65a secured to associated pistons. The compressed air cylinders are supplied with compressed air from a common compressed air conduit 66 having branch conduits 67 and 68 each to its respective cylinder. On the opposite side of the column 33, there is arranged a centering or guide rail 69 having a series of transverse pins 70 arranged at mutually uniform distances in the height direction of the column. The head 34 is adapted to be positioned accurately relative to the column 33 by means of a pawl 71 which is adapted to be received in a desired intermediate space between two pins 70 of the rail 69. During vertical displacement of the head relative to the column, the pawl 71 is urged laterally out of engagement with the rail 69 by means of a compression spring 72 which is fixed between the bottom of a compressed air cylinder 73 and a piston 74 secured to a piston rod 75 which is connected to the pawl 71. On supplying compressed air to the opposite side of the piston 74, the pawl 71 can be correspondingly pushed into place in engagement between two pins 70 of the guide rail 69. During vertical adjustment of the head 34, there is obtained a desired rough adjustment of the head 34 relative to the column 33, and by means of a fine adjustment mechanism in connection with the pawl 71, there can be achieved an intended accurate adjustment of the head 34 governed by the positioning of the pins 70 on the guide rail 69. The pawl 71 is, as shown in FIG. 6, provided with inclined guide surfaces 71a and 71b in order to require a desired entry of the pawl 71 between the guide pins 70. The pawl 71, with associated piston rod 75 and cylinder 73, is pivotably mounted at 76 of the head 34. By means of oppositely operating compression springs 77, 78, the pressure cylinder 73 is adjusted with associated pawl 71 into a desired central position as the initial position for the desired centering of the pawl relative to the column 33. In instances where the head 34 is not accurately adjusted relative to the column 33, the springs 77, 78 will permit a certain pivoting of the cylinder 73 with the pawl 71 so as to permit entry of the pawl 71 between the pins 70. The pawl 71 is urged into place between the pins 70 by supplying compressed air to the cylinder 73 via a pressure supply conduit 79.

After the pawl 71 is urged into place between two pins 70 as is shown in FIG. 6, the head 34 is afterwards adjusted relative to the pins 70 by means of two compressed air cylinders 80, 81. The compressed air cylinders 80, 81 are pivotably mounted at 80a, 81a while their associated piston rods 80b and 81b are pivotably mounted on the pawl 71 via elongated grooves 71c. The two pressure medium cylinders are supplied with pressure medium via a pressure conduit 82 so that the pawl 71 is disposed exactly horizontal relative to the head 34 and thereby accurately adjusts the head relative to the column 33. By this, the guide bar 63 will possibly be tilted somewhat relative to the chain 36, the chain being immovable relative to the column 33, while immediately the engagement between the pawl 71 and the guide bar 69 is eliminated, the guide bar 63 reverts back to the illustrated horizontal position governed by the position of the chain relative to the column 33. The desired adjustment of the head 34 relative to the column is effected by remote control and on stopping the head 34 there is given a signal from a digital reading belt 83, but as a consequence of the inertia in the system, possible slack in the chain and the like, there will possibly occur a by-passing of the head 34 relative to the accurate digital reading system. However, by means of the described micro-adjustment system there can, nevertheless, be obtained, as intended, an accurate adjustment of the head 34 relative to the column 33 governed by means of the pins 70 on the guide rail 69. The pins 70 can, for example, be arranged at a mutual distance of 30 mm, with the height adjustment of the rack roller tracks arranged in a corresponding module system.

The article transfer assembly is constructed as light in weight as possible and all portions are, so far as is expedient, made of light metal so that all movements are able to take place as rapidly as possible and, in this way, reduce forces of gravity during acceleration and braking. In the embodiment which is illustrated in FIG. 2, there is employed a simple rail system. On maximum utilisation of the system, the speed of motion must be able to be increased to the technically largest possible speed of motion both horizontally and vertically. In this connection, there is employed, as shown in the alternative embodiment of FIGS. 8 and 9, in addition to the lower rails 28, 29 a set of upper rails 28a, 29a with associated guide wheels 30a which normally lie at a certain mimimum distance from the guide rails 28a, 29a but prevent any undesired rocking about of the article transfer assembly relative to the lower rails 28, 29. The clearance between the wheels 30a and the rails 28a, 29a is of the order of magnitude of 1/10 to 2/10 mm.

In the construction which is shown in FIG. 2, the column 33 is supported at the top by means of inclined support means 84 and, if desired, there can be designed in the head 34 a counterweight (not shown) in order to achieve counterbalancing of the article retrieving means relative to the column.

In FIG. 10, there is illustrated another system in which instead of the conventional counterweight, there is employed a pressure medium-controlled system. The article retrieving means is shown fastened to a wire 85 which extends over a pair of rollers 86, 87 at the top of the column 33 and further downwards about a moveable roller 88 and upwardly to a fastening 89 at the top of the column 33. The moveable roller 88 is secured to the outer end of a piston rod 90, the piston of which is received in a compressed air cylinder 92 having an opening 93 to free air at the lower end of the cylinder and having an opening 94 to a compressed air conduit 95 at the upper end of the cylinder. The compressed air conduit 95 comprises a spiral flexible pipe 96 which can be drawn out when the carriage moves and is suspended in a horizontal track mounted in the intermediate space at the upper end of the rack. The compressed air conduit 95 is supplied compressed air from a pump 97 via a branch conduit 98 and is connected via another branch conduit 99 to a control cylinder 100 having a piston 101 which, via a piston rod 102 and a wire 103 which passes over rollers 104, 105, is connected to a counterweight 106 in a housing 107. The piston area of the piston 101 is ten times larger than the piston area of the piston 91 so that the speed of movement of the counterweight 106 is only 1/10 of the speed of movement in the cylinder 92. The gearing between the article retrieving means 35 and the cylinder 92 is in the ratio 1:2, as a consequence of the path of the wire over the roller 88 and as a consequence of the area difference between the pistons 91 and 101, there is achieved a total gearing of 1:20 with a ratio between the material weight of the article retrieving means and the counterweight 106 of 1:400.

In practice, this will mean that one will employ a counterweight 106 which is twenty times larger than the weight of the article retrieving means 35. The pump 97 is adapted to compensate for the air which must leak out of the system. Furthermore, the pump is controlled by a level presser which starts the pump if the piston 101 comes too far up in the cylinder 100 or the counterweight 106 too far down in the housing 107. It is assumed that there is coupled into the air system, a pressure breaker which disconnects the equipment totally if the pressure sinks below a predetermined level. This is appropriate if there is a break in the flexible pipe or otherwise large leakages.

The rack roller tracks are without complicated mechanisms in the illustrated embodiment, each roller track being provided with the said blocking mechanism 52 which is normally in the blocking position. Any disengagement of the blocking mechanism of the rack roller tracks occurs, via the article transfer assembly, on actuation via the actuating means 51. The article 42 which lies foremost in the rack roller track, rolls by its own force of gravity directly onto the roller track of the article retrieving means and is transported further from the latter in the manner which is described above, while subsequent articles 42 on the rack roller track are rolled in braking fashion into place on the roller track 20a by means of a suitable braking arrangement. A braking arrangement of a suitable type is illustrated in Norwegian Patent application No. 760,965. The said actuating means 51 which actuates the blocking plate 53 in the blocking mechanism 52 can, if necessary, also be employed to actuate the braking arrangement for the rollers of the rack roller tracks.

The moiton of the carriage 31 of the article transfer assembly horizontally on the rails 28, 29 to desired horizontal positions can be effected at the same time as the article retrieving means 35 is displaced vertically on the column 33 by means of the chain drive 36. In order to achieve an effective and accurate transfer of the articles from the rack to the article transfer assembly, it is of the greatest importance that the article retrieving means can be adjusted into a precise vertical position relative to the rack roller track while, on the other hand, there can be tolerated smaller or greater deviations in the horizontal direction since provision has been made for the roller tracks of the article retrieving means to project laterally outside of the rack roller tracks.

I claim:

1. Article storage and handling system for retrieving an article from a storage rack and transferring said article to a collecting conveyor which comprises:
    (a) a storage rack having a series of drivable roller tracks arranged above each other as well as side-by-side;
    (b) an article transfer assembly common to said series of roller tracks and comprising:
        (i) article retrieving means adapted to be drivably adjusted in a vertical direction into operative retrieving cooperation with a preselected one of said roller tracks, said retrieving means comprising guide means and a horizontal conveyor drivable transversely of the length of said guide means, said guide means providing a rectilinear path for said article between said roller track and said horizontal conveyor,
        (ii) an inclined conveyor one end of which cooperates with said horizontal conveyor and is adapted to be raised and lowered along with said article retrieving means,
        (iii) a carriage unit supporting said article retrieving means and inclined conveyor and including an upstanding column, and
        (iv) an adjusting means for adjusting the height of said article retrieving means into an accurately aligned position with respect to said preselected roller track and comprising rough and fine adjustment mechanisms,
    (c) a horizontal collecting conveyor supporting the other, opposite end of said inclined conveyor and said carriage unit being mounted for horizontal displacement along said collecting conveyor; and
    (d) a stopping machanism for said preselected roller track enabling transfer of said article from said rack to said retrieving means; the horizontal conveyor, the inclined conveyor and the collecting conveyor being adapted to advance said article in continuous motion in one and the same direction and said column guidably permitting said article retrieving means to be moved by way of said rough adjustment mechanism somewhat beyond a desired position while the fine adjustment mechanism automatically and accurately adjusts said retrieving means into a preselected height position on said column, said rough adjustment mechanism comprising a pivotably mounted pressure medium cylinder operatively associated with an axially displaceable pawl moveable inwardly and self-centeringly into an intermediate space defined between guide pins arranged in a vertical row on a vertical guide rail of said column and said fine adjustment mechanism comprising at least one of a pair of compression springs and a pair of pressure medium-controlled control means arranged one on each side of said pawl and providing for the adjustment of said pawl into an accurately centered position.

2. System in accordance with claim 1, wherein said article retrieving means comprises a hollow head component mounted around said upstanding column for displacement longitudinally of the latter and said adjusting means comprises a chain drive, a pivot arm and pressure medium cylinder means, said chain drive being arranged at one side of said column for guidably adjusting the height of said head on said column and said pivot arm and said pressure medium cylinder means being located within said head component at said one side of said upstanding column, said pivot arm being fixed at one end to said chain drive and pivoted at its opposite end to a vertical wall of said head component remote from said column and said pressure medium cylinder means being actuable by pressure medium to act on opposite sides of said pivot arm and retain said head component in position relative to said chain drive, and wherein said rough and fine adjustment mechanisms are located within said head component at a side of said column opposite said one side.

3. System in accordance with claim 2, wherein said pressure medium cylinder of said rough adjustment mechanism is pivotably mounted at a vertical wall of said head component remote from said column and is spring-loaded to urge said pawl laterally out of engagement with said guide rail while being actuable by pressure medium to push said pawl against the spring loading into engagement with said guide rail, said pair of compression springs of said fine adjustment mechanism acting in opposite directions one on each side of said pressure medium cylinder to permit entry of said pawl between said pins on said rail.

4. System in accordance with claim 2, wherein said pressure medium-controlled control means comprises a pair of pressure medium cylinders pivotably mounted adjacent said vertical guide rail at opposite horizontal sides of said head component and with associated piston rods thereof pivotably mounted on said pawl, said cylinders being actuable by pressure medium to maintain said pawl horizontal relative to said head component.

* * * * *